(12) United States Patent
Sunkara et al.

(10) Patent No.: US 12,197,930 B2
(45) Date of Patent: *Jan. 14, 2025

(54) MACHINE-LEARNED MODELS FOR USER INTERFACE PREDICTION, GENERATION, AND INTERACTION UNDERSTANDING

(71) Applicant: Google LLC, Mountain View, CA (US)

(72) Inventors: Srinivas Kumar Sunkara, Mountain View, CA (US); Xiaoxue Zang, Santa Clara, CA (US); Ying Xu, Bellevue, WA (US); Lijuan Liu, San Jose, CA (US); Nevan Holt Wichers, Mountain View, CA (US); Gabriel Overholt Schubiner, New York, NY (US); Jindong Chen, Hillsborough, CA (US); Abhinav Kumar Rastogi, Sunnyvale, CA (US); Blaise Aguera-Arcas, Seattle, WA (US); Zecheng He, Princeton, NJ (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/466,267

(22) Filed: Sep. 13, 2023

(65) Prior Publication Data

US 2024/0004677 A1 Jan. 4, 2024

Related U.S. Application Data

(63) Continuation of application No. 17/335,596, filed on Jun. 1, 2021, now Pat. No. 11,789,753.

(51) Int. Cl.
*G06F 9/44* (2018.01)
*G06F 9/451* (2018.01)
*G06F 18/2135* (2023.01)
*G06F 18/214* (2023.01)
*G06N 3/045* (2023.01)
*G06N 20/00* (2019.01)

(52) U.S. Cl.
CPC ........ *G06F 9/451* (2018.02); *G06F 18/21355* (2023.01); *G06F 18/214* (2023.01); *G06N 3/045* (2023.01); *G06N 20/00* (2019.01)

(58) Field of Classification Search
CPC .................................................... G06F 9/542
USPC ......................................................... 719/328
See application file for complete search history.

(56) References Cited

U.S. PATENT DOCUMENTS

2018/0165554 A1* 6/2018 Zhang ................. G06N 7/01
2019/0304157 A1* 10/2019 Amer ................. G06V 40/23
2020/0159795 A1* 5/2020 Weldemariam ..... G06F 16/9535

OTHER PUBLICATIONS

Alberti et al., "Fusion of Detected Objects in Text for Visual Question Answering", arXiv:1908.05054v2, Nov. 3, 2019, 10 pages.

(Continued)

*Primary Examiner* — Timothy A Mudrick
(74) *Attorney, Agent, or Firm* — DORITY & MANNING P.A.

(57) ABSTRACT

Generally, the present disclosure is directed to user interface understanding. More particularly, the present disclosure relates to training and utilization of machine-learned models for user interface prediction and/or generation. A machine-learned interface prediction model can be pre-trained using a variety of pre-training tasks for eventual downstream task training and utilization (e.g., interface prediction, interface generation, etc.).

20 Claims, 8 Drawing Sheets

(56) References Cited

OTHER PUBLICATIONS

Ba et al., "Layer Normalization", arXiv:1607.06450v1, Jul. 21, 2016, 14 pages.
Cer et al., "Universal Sentence Encoder", arXiv:1803.11175v2, Apr. 12, 2018, 7 pages.
Chen et al., "Unblind Your Apps: Predicting Natural-Language Labels for Mobile GUI Components by Deep Learning", arXiv:2003.00380v2, Jul. 2, 2020, 13 pages.
Chen et al., "UNITER: UNiversal Image-Text Representation Learning", European Conference on Computer Vision, Aug. 23-28, 2020, Online, 17 pages.
Chung et al., "Empirical Evaluation of Gated Recurrent Neural Networks on Sequence Modeling", arXiv:1412.3555v1, Dec. 11, 2014, 9 pages.
Deka et al., "Rico: A Mobile App Dataset for Building Data-Driven Design Applications", ACM Symposium on User Interface Software and Technology (UIST), Oct. 22-25, 2017, Quebec City, Canada, 10 pages.
Devlin et al., "BERT: Pre-training of Deep Bidirectional Transformers for Language Understanding", arXiv:1810.04805v2, May 24, 2019, 16 pages.
Firebase, "Get Started with Robo tests", https://firebase.google.com/docs/test-lab/android/robo-ux-test, retrieved on Jul. 26, 2021, 6 pages.
Glorot et al., "Understanding the difficulty of training deep feedforward neural networks", International Conference on Artificial Intelligence and Statistics (AISTATS), May 13-15, 2010, Sardinia, Italy, 8 pages.
He et al., "ActionBert: Leveraging User Actions for Semantic Understanding of User Interfaces", arXiv:2012.12350v2, Jan. 25, 2021, 8 pages.
He et al., "Deep Residual Learning for Image Recognition", Conference on Computer Vision and Pattern Recognition (CVPR), Jun. 26-Jul. 1, 2016, Las Vegas, NV, 9 pages.
Huang et al., "Swire: Sketch-based User Interface Retrieval", ACM Conference on Human Factors in Computing Systems (CHI), May 4-9, 2019, Glasgow, Scotland, 10 pages.
Jozefowicz et al., "Exploring the Limits of Language Modeling", arXiv:1602.02410v2, Feb. 11, 2016, 11 pages.
Kingma et al., "Adam: A Method for Stochastic Optimization", arXiv:1412.6980v1, Dec. 22, 2014, 9 pages.
Lan et al., "ALBERT: A Lite BERT for Self-supervised Learning of Language Representations", International Conference on Learning Representations, May 6-9, 2019, New Orleans, Louisiana, 17 pages.
Li et al., "Mapping Natural Language Instructions to Mobile UI Action Sequences", 58th Annual Meeting of the Association for Computational Linguistics, Jul. 5-10, 2020, Virtual, pp. 8198-8210.
Li et al., "Unicoder-VL: A Universal Encoder for Vision and Language by Cross-modal Pre-training", arXiv:1908.06066v3, Dec. 3, 2019, 8 pages.
Li et al., "VisualBERT: A Simple and Performant Baseline for Vision and Language", arXiv:1908.03557v1, Aug. 9, 2019, 14 pages.
Li et al., "Widget Captioning: Generating Natural Language Description for Mobile User Interface Elements", Conference on Empirical Methods in Natural Language Processing, Nov. 16-20, 2020, Virtual, 16 pages.
Liu et al., "Learning Design Semantics for Mobile Apps", ACM Symposium on User Interface Software and Technology (UIST), Oct. 14-17, 2018, Berlin, Germany, 11 pages.
Lu et al., "ViLBERT: Pretraining Task-Agnostic Visiolinguistic Representations for Vision-and- Language Tasks", 33rd Conference on Neural Information Processing Systems (NeurIPS 2019), Dec. 8-14, 2019, Vancouver, Canada, 11 pages.
Maaten et al., "Visualizing Data using t-SNE", Journal of Machine Learning Research, vol. 9, Nov. 2008, pp. 2579-2605.
MLKit, "Recognize text in images with ML Kit on Android", https://developers.google.com/ml-kit/vision/text-recognition/android, retrieved on Jul. 27, 2021, 10 pages.
Qi et al., "ImageBERT: Cross-modal Pre-training with Large-scale Weak-Supervised Image-text Data", arXiv: 2001.07966, Jan. 23, 2020, 12 pages.
Ren et al., "Faster R-CNN: Towards Real-Time Object Detection with Region Proposal Networks", International Conference on Learning Representations, May 7-9, 2015, San Diego, CA, 9 pages.
Su et al., "VL-BERT: Pre-Training of Generic Visual-Linguistic Representations", International Conference on Learning Representations, Apr. 26-May 1, 2020, Virtual, 16 pages.
Swearngin et al., "Modeling Mobile Interface Tappability Using Crowdsourcing and Deep Learning", ACM Conference on Human Factors in Computing Systems (CHI), May 4-9, 2019, Glasgow, Scotland, 11 pages.
Tan et al., "EfficientNet: Rethinking Model Scaling for Convolutional Neural Networks", International Conference on Machine Learning, Jun. 9-15, 2019, Long Beach, California, 10 pages.
Vaswani et al., "Attention Is All You Need", 31st Conference on Neural Information Processing Systems (NIPS 2017), Dec. 4-9, 2017, Long Beach, CA, 11 pages.
Wichers et al., "Resolving Referring Expressions in Images with Labeled Elements", arXiv:1810.10165v1, Oct. 24, 2018, 7 pages.
Wu et al., "Google's Neural Machine Translation System: Bridging the Gap between Human and Machine Translation", arXiv:1609.08144v2, Oct. 8, 2016, 23 pages.
Wu et al., "Predicting and Diagnosing User Engagement with Mobile UI Animation via a Data-Driven Approach", International Conference of Human-Computer Interaction, Apr. 25-30, 2020, Honolulu, Hawaii, 13 pages.
Wu et al., "Understanding and Modeling User-Perceived Brand Personality from Mobile Application UIs", ACM Conference on Human Factors in Computing Systems (CHI), May 4-9, 2019, Glasgow, Scotland, 12 pages.

* cited by examiner

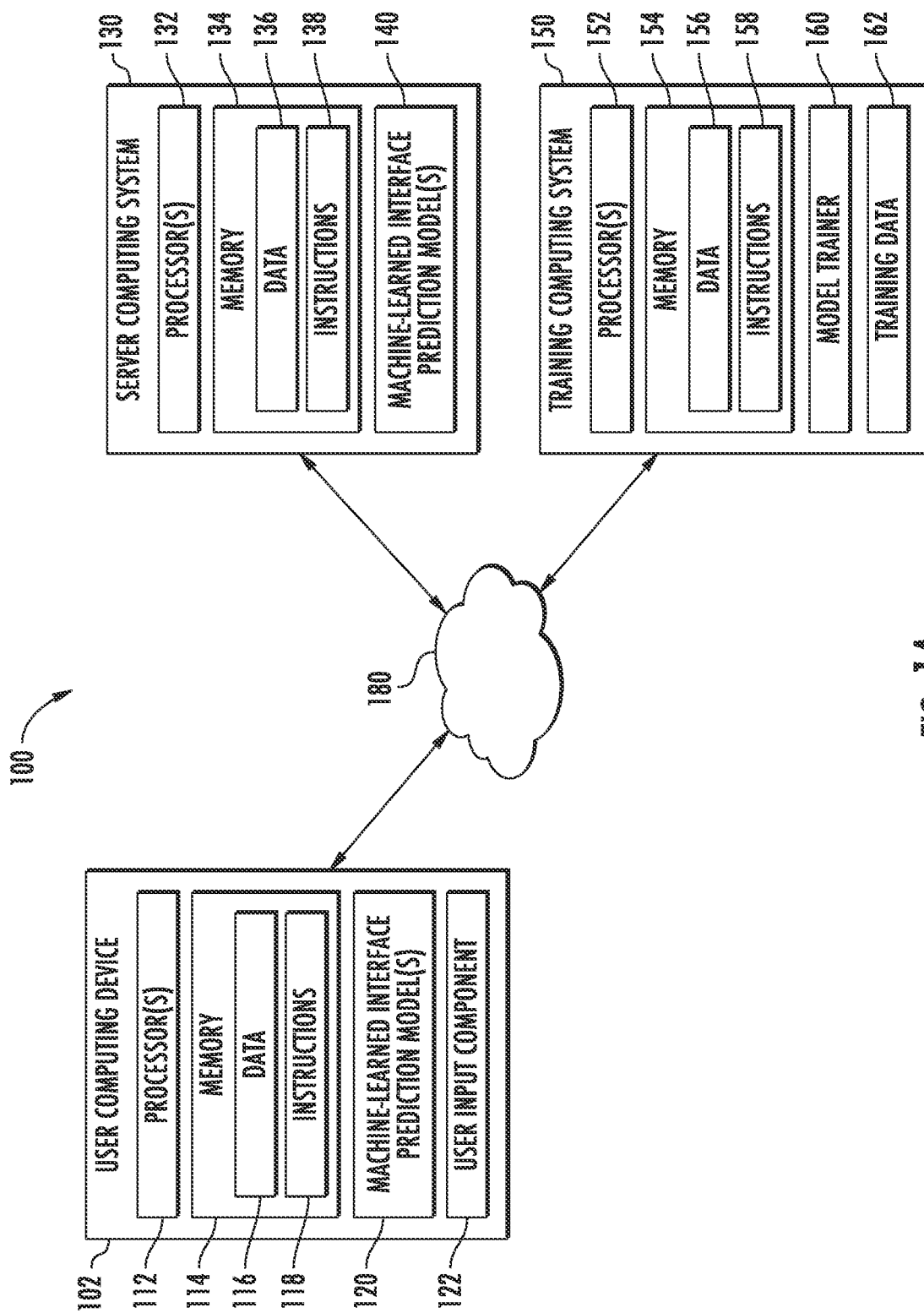

MACHINE-LEARNED MODELS FOR USER INTERFACE PREDICTION, GENERATION, AND INTERACTION UNDERSTANDING

PRIORITY CLAIM

The present application is a continuation of U.S. application Ser. No. 17/335,596 having a filing date of Jun. 1, 2021. Applicant claims priority to and the benefit of each of such applications and incorporate all such applications herein by reference in its entirety.

FIELD

The present disclosure relates generally to user interface representation and understanding. More particularly, the present disclosure relates to training and utilization of machine-learned models for user interface prediction and/or generation based on demonstrations of interactions taken in user interfaces.

BACKGROUND

Given the prevalence and importance of smart devices in our daily life, the ability to understand and operate User Interfaces (UIs) has become an important task for Artificial Intelligence. For instance, a model that can find a UI component by its description can be very useful for voice interfaces, and a model that can predict the expected output of clicking a button can help page navigation. To successfully operate a UI, the models need to understand the user task and intents, and how to perform the tasks in the given UI.

However, UI understanding is a challenging and less-studied area. First, there are various tasks related to UI understanding. Usually, these tasks are cross-modal and cross-domain, e.g., clicking a button through voice command and retrieving an icon via a semantically similar one. Previous works in this field usually target one single task at a time. Training a different complex model for each task is not efficient for on-device model deployment.

Moreover, models may suffer from overfitting if the task-specific data is limited. Pre-training models on large-scale datasets to extract features has shown great power in multiple domains, e.g., ResNet in computer vision and transformer-based in natural language processing. There is no such generic feature representation for user interfaces and it is not clear if a pre-trained feature extraction model can help improve multiple UI related tasks.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for training and utilization of machine-learned models for user interface interaction understanding. The method includes obtaining, by a computing system comprising one or more computing devices, interface data that comprises a sequence of two or more user interfaces obtained through performance of one or more user interactions which result in generation of the sequence of two or more user interfaces, wherein, for each user interface in the sequence of two or more user interfaces, the interface data comprises one or more interface images depicting the user interface. The method includes determining, by the computing system, a plurality of intermediate embeddings based at least in part on the interface data. The method includes processing, by the computing system, the plurality of intermediate embeddings with a machine-learned interface prediction model to obtain one or more user interface embeddings. The method includes performing, by the computing system, a pre-training task based at least in part on the one or more user interface embeddings to obtain a pre-training output.

Another example aspect of the present disclosure is directed to a computing system that includes one or more processors and one or more tangible, non-transitory computer readable media storing computer-readable instructions that store a machine-learned interface prediction model configured to generate learned representations for user interfaces. The machine-learned interface prediction model has been trained by performance of operations. The operations include obtaining interface data that comprises a sequence of two or more user interfaces obtained through performance of one or more user interactions which result in generation of the sequence of two or more user interfaces, wherein, for each user interface in the sequence of two or more user interfaces, the interface data comprises one or more interface images depicting the user interface. The operations include determining a plurality of intermediate embeddings based at least in part on the interface data. The operations include processing the plurality of intermediate embeddings with a machine-learned interface prediction model to obtain one or more user interface embeddings. The operations include performing a pre-training task based at least in part on the one or more user interface embeddings to obtain a pre-training output.

Another example aspect of the present disclosure is directed to one or more tangible, non-transitory computer readable media storing computer-readable instructions that when executed by one or more processors cause the one or more processors to perform operations. The operations include obtaining interface data that comprises a sequence of two or more user interfaces obtained through performance of one or more user interactions which result in generation of the sequence of two or more user interfaces, wherein, for each user interface in the sequence of two or more user interfaces, the interface data comprises one or more interface images depicting the user interface. The operations include determining a plurality of intermediate embeddings based at least in part on the interface data. The operations include processing the plurality of intermediate embeddings with a machine-learned interface prediction model to obtain one or more user interface embeddings. The operations include performing a prediction task based at least in part on the one or more user interface embeddings to obtain a prediction output.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 1A depicts a block diagram of an example computing system that performs training and utilization of machine-learned interface prediction models according to example embodiments of the present disclosure.

Figure 1B:
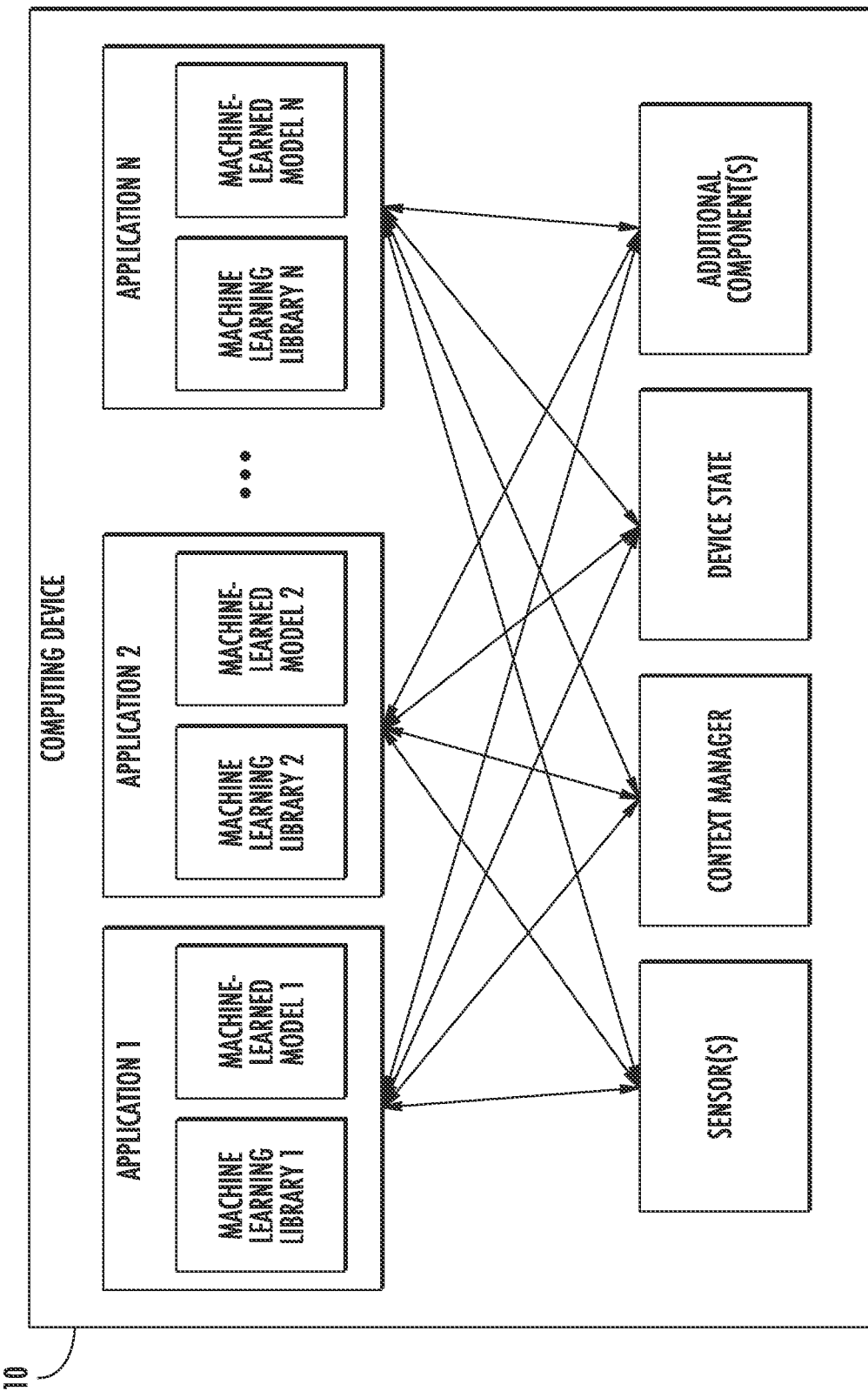
FIG. 1B depicts a block diagram of an example computing device that performs pre-training of a machine-learned interface prediction model according to example embodiments of the present disclosure.

Reference numerals that are repeated across plural figures are intended to identify the same features in various implementations.

DETAILED DESCRIPTION

Overview

Example aspects of the present disclosure are directed to training and utilization of machine-learned models for user interface prediction and/or generation based on demonstrations of interactions taken in user interfaces. In one example, a machine-learned interface prediction model can be pre-trained on various pre-training tasks which use interface data as an input. Specifically, in some examples, the interface data can describe a sequence of two or more user interfaces that demonstrate a user interaction trace. Stated differently, the two or more user interfaces can be a sequence of user interfaces which result from a user sequentially interacting with an element in each user interface (except the last user interface in the sequence). The machine-learned interface prediction model can generate one or more interface embeddings which represent the user interface(s) and/or interactions or functionality associated therewith in an embedding space (e.g., a latent embedding space).

In particular, as mobile devices are becoming ubiquitous, regularly interacting with a variety of user interfaces (UIs) is a common aspect of daily life for many people. To improve the accessibility of these devices and to enable their usage in a variety of settings, building models that can assist users and accomplish tasks through the UI is vitally important.

However, there are several challenges to achieve this. First, UI components of similar appearance can have different functionalities, making understanding their function more important than just analyzing their appearance. For example, multiple different user interfaces may include the same icon but assign different functionalities to the icon (e.g., as a result of being developed by different developers and/or for different purposes or contexts).

Second, the data source and format of UIs are different from natural image and language corpuses. For example, the View Hierarchy (VH) in mobile apps and Document Object Model (DOM) in web pages are tree structures representing the UI layout. The VH and DOM contain structural and semantic information about the UI, however they are not generally visible to the users and they also contain short phrases with hints about functionality. Effectively making use of this domain-specific knowledge for general UI understanding is an unsolved problem.

Third, owing to a large diversity in UIs and absence of standard DOM or VH representations, building a UI understanding model with high coverage requires large amounts of training data.

To resolve these issues and others, the present disclosure provides a new pre-trained UI representation model. For example, the representation model can be or include a pre-trained transformer-style model. This approach can take advantage of the representation power of transformer models, and can, in some implementations, integrate domain-specific information like VH or DOM and user interactions to build embeddings reflecting the functionality of different UI elements.

Thus, the input to the model can include visual, linguistic and/or domain-specific features in user interaction traces to pre-train generic feature representations of UIs and their components. In particular, one insight leveraged by the proposed techniques is that user interactions, e.g., a sequence of clicks on different UI components, reveals important information about their functionality. Thus, the input data can include interface data descriptive on demonstrative of user interactions, e.g. a sequence of clicks and their effect on the UI.

The proposed models can be used on a wide variety of downstream tasks, ranging from icon classification to UI component retrieval based on its natural language description. Experiments show that the proposed models outperform multi-modal baselines across all downstream tasks by up to 15.5%.

Thus, example aspects of the present disclosure relate to training and utilization of machine-learned models for user interface interaction understanding. As a particular example, interface data can be obtained. The interface data can include a sequence of two or more user interfaces obtained through performance of one or more user interactions which result in generation of the sequence of two or more user interfaces. In some implementations, for each user interface in the sequence of two or more user interfaces, the interface data can include structural data and one or more interface images depicting the user interface. The structural data can be indicative of one or more positions of each of a plurality of interface elements included in the user interface.

A plurality of intermediate embeddings can be determined based on the interface data (e.g., the structural data, the one or more interface images (also referred to as IMG in the rest of this document), and/or textual content depicted in the one or more interface images (e.g., using text recognition models (OCR), etc.)). These intermediate embeddings can be processed with a machine-learned interface prediction model to obtain one or more user interface embeddings. Based on the one or more user interface embeddings, a pre-training task can be performed to obtain a pre-training output. In such fashion, the machine-learned interface prediction model can be pre-trained using a variety of pre-training tasks for eventual downstream task training and utilization (e.g., interface prediction, interface generation, interface element retrieval, etc.).

The pre-training task can be performed by processing the one or more user interface embeddings with the machine-learned interface prediction model or a separate pre-training prediction head to obtain the pre-training output, which can include a prediction for the one or more portions of the one or more interface images. The separate pre-training prediction head can be a small prediction component such as a linear model, a multi-layer-perceptron, or similar.

More particularly, interface data can be obtained that describes a sequence of two or more user interfaces that demonstrate a user interaction trace. Stated differently, the two or more user interfaces can be a sequence of user interfaces which result from a user sequentially interacting with an element in each user interface except the last user interface in the sequence. Each user interface in the sequence of two or more user interfaces can include a plurality of user interface elements (e.g., icon(s), interactable button(s), image(s), textual content, etc.). The interface data can include structural data (e.g., metadata indicative of the position(s) of interface element(s), etc.) and an interface image that depicts the user interface.

Each user interface can be a user interface associated with an application and/or operating system of a computing device. As an example, the user interface may be a main menu interface for a food delivery application. As another example, the user interface may be a lock screen interface for a smartphone device. As yet another example, the user interface may be a home screen interface for a virtual assistant device or a video game console. As such, it should be broadly understood that the user interface may be any type of interface for any sort of device and/or application.

The user interface can include a plurality of interface elements. The interface elements can include icon(s), interactable element(s) (e.g., buttons, etc.), indicator(s), etc. As an example, an interface element can be or otherwise include an interactable element that navigates to a second user interface when selected by a user (e.g., using a touch gesture on a touch screen device, etc.). As another example, an interface element can be or otherwise include an input field that is configured to accept user input (e.g., via a virtual on-screen keyboard, etc.). As yet another example, an interface element can be or otherwise include an icon descriptive of function(s) of a smartphone device that the user interface is displayed by (e.g., a connectivity indication icon, a battery life icon, etc.). As such, it should be broadly understood that the plurality of interface elements can include any discrete functional unit or portion of the user interface.

The interface data for each user interface can include structural data. The structural data can indicate one or more positions of one or more interface elements of the plurality of interface elements. As an example, the structural data can indicate a size and position of an icon interface element within the user interface when presented. As another example, the structural data can indicate or otherwise dictate various characteristics of an input field interface element (e.g., font, text size, field size, field position, feedback characteristics (e.g., initiating a force feedback interaction when receiving input from a user, playing sound(s) when receiving input from a user, etc.), functionality between other application(s) (e.g., allowing use of virtual keyboard application(s), etc.), etc.).

In some implementations, the structural data can be or otherwise include view hierarchy data. As used herein, the term "view hierarchy data" can refer to data descriptive of a View Hierarchy and/or data descriptive of a Document Object Model. The view hierarchy data can include a tree representation of the UI elements. Each node of the tree can describe certain attributes (e.g. bounding box positions, functions, etc.) of an interface element. As an example, the view hierarchy tree of the structural data can include textual content data associated with visible text of textual interface element(s) included in the user interface. As another example, the view hierarchy tree of the structural data can include content descriptor(s) and/or resource-id(s) that can describe functionality (e.g. interface navigation path(s), sharing functionality, etc.) which is generally not provided to users. As another example, the view hierarchy tree of the structural data can include class name data descriptive of function class(es) of application programming interface(s) and/or software tool(s) associated with implementation of the corresponding interface element. As another example, bounding data can denote an interface element's bounding box location within the user interface. It should be noted that, in some implementations, various types of data (e.g., textual content data, etc.) can be empty within the view hierarchy data.

More particularly, in some implementations the structural data can be or otherwise include view hierarchy leaf nodes of view hierarchy tree data. For each leaf node, the content of the nodes' textual fields can be encoded into feature vectors (e.g., text, content descriptor(s), resource ID(s), class name(s), etc.). In some implementations, as a preprocessing step, the content of the class name data can be normalized by heuristics to one of a discrete number of classes. Additionally, or alternatively, in some implementations, as a preprocessing step, the content of resource ID data can be split by underscores and camel cases. The normalized class name data can be encoded as a one-hot embedding, while the content of other fields can be processed to obtain their sentence-level embeddings.

Additionally, the interface data for each user interface can include one or more interface images that depict the user interface. For example, the one or more interface images can be an image captured as the user interface is displayed on a display device (e.g., capturing using a camera device, a screen capture application, etc.). Additionally, the one or more interface images can depict textual content. As an example, the user interface can be a home screen interface for a smartphone device with textual content that includes text. The text can be recognized (e.g., using optical character recognition model(s), etc.) to obtain the textual content.

In some implementations, the interface data can further include data descriptive of one or more link components. The one or more link components can be elements (e.g., icons, images, etc.) of the user interfaces which are the targets of the user interactions. Stated differently, the link components for each pair of sequential user interfaces can be the element of the first user interface which was selected or otherwise interacted with by the user so as to traverse from the first user interface to the second user interface. In some implementations, the data descriptive of one or more link components can be or include images of the one or more link components.

Based at least in part on the user interface data (e.g., structural data, the one or more interface images, and/or textual content depicted in the one or more interface images), a plurality of intermediate embeddings can be determined. In some implementations, the intermediate embeddings can be or otherwise include one or more image embeddings, one or more textual embeddings, one or more positional embeddings, and/or one or more content embeddings. As an example, features extracted from the interface data can be linearly projected to obtain the plurality of intermediate embeddings $C_i \in \mathbb{R}^d$ for every $i_{th}$ input with type(i)∈{IMG, OCR, VH} and use 0s for the inputs of other types.

More particularly, in some implementations, the one or more positional embeddings can be determined from the structural data. The one or more positional embeddings can correspond to the one or more positions of the one or more respective interface elements. As an example, the location feature of each interface element can be encoded using its bounding box (e.g., as described by the structural data, etc.), which can include normalized top-left, bottom-right point coordinates, width, height, and/or the area of the bounding box. For example, a linear layer can be used to project the location feature to the positional embedding, $P_i \in \mathbb{R}^d$, for the $i_{th}$ component ($P_i = 0$ for CLS (indicating an embedding for the entire sequence of one or more user interfaces) and SEP (indicating a separator between embeddings of different types)).

In some implementations, the one or more image embeddings can be determined from the one or more interface images. The one or more image embeddings can be respectively associated with at least one interface element of the plurality of interface elements. As an example, one or more portions of the one or more interface images can be determined from the one or more interface images (e.g., based on the bounding boxes described by the structural data, etc.). A machine-learned model (e.g., the machine-learned interface prediction model, etc.) can process the portion(s) of the one or more interface images to obtain the respective one or more image embeddings (e.g., using a last spatial average pooling layer, etc.).

In some implementations, the plurality of intermediate embeddings can include one or more type embeddings. The one or more type embeddings can respectively indicate a type of embedding for each of the other embeddings of the plurality of intermediate embeddings. As an example, to distinguish the various portions of the interface data, six type tokens can be utilized: IMG, OCR, VH, CLS, SEP, and MASK. In some implementations, the MASK token can be a type of token utilized to increase pre-training accuracy for the machine-learned interface prediction model.

In some implementations, the plurality of intermediate embeddings can be determined by processing the structural data, the one or more interface images, and/or textual content depicted in the one or more interface images with an embedding portion of the machine-learned interface prediction model to obtain the plurality of intermediate embeddings. For example, the interface data (e.g., the structural data, the one or more interface images, etc.), can be input to the embedding portion to obtain the intermediate embeddings, which can then be processed with a separate portion of the machine-learned interface prediction model (e.g., a transformer portion, etc.) to obtain the one or more user interface embeddings.

The plurality of intermediate embeddings can be processed with the machine-learned interface prediction model to obtain one or more user interface embeddings. More particularly, each of the types of intermediate embeddings can be summed or concatenated, and can be processed by the machine-learned interface prediction model. In some implementations, a transformer portion of the machine-learned interface prediction model can process the intermediate embeddings to obtain the one or more user interface embeddings.

Based at least in part on the one or more user interface embeddings, a pre-training task can be performed. In some implementations, a loss function can be evaluated that evaluates a difference between ground truth data and the pre-training output. As an example, the ground truth data can describe an optimal prediction based on a masked input to the machine-learned interface prediction model. In some implementations, one or more parameters of the machine-learned interface prediction model can be adjusted based at least in part on the loss function (e.g., parameters of the transformer function and/or the embedding portion of the model). In such fashion, pre-training tasks can be used to train the machine-learned interface prediction to provide superior or more useful representations (e.g., user interface embeddings) for given input interface data.

One example pre-training task is a link component prediction task. For example, in the link component prediction task the pre-training output can be or include a predicted link component for a sequential pair of the two or more user interfaces. The predicted link component can be a prediction of which element of a first user interface of the sequential pair was a target of the user interaction to result in a second user interface of the sequential pair. Stated differently, the link component prediction task can test the model's ability to select which element of the first user interface was selected or interacted with by a user to achieve or result in the second user interface.

Another example pre-training task is a consecutive UI prediction task. For example, in the consecutive UI prediction task, the computing system can replace one or more of user interfaces in the sequence of two or more user interfaces with a replacement user interface prior to determining the plurality of intermediate embeddings. The pre-training output can indicate whether each pair of user interfaces in the sequence of two or more user interfaces are consecutive user interfaces achievable via a single user interaction. Stated differently, the consecutive UI prediction task can test the model's ability to determine whether a given pair of sequential user interfaces are in fact sequential (original) or if one has been replaced with a replacement.

Another example pre-training task is a masked view hierarchy prediction task. In the view hierarchy prediction task, the structural data for each user interface further includes view hierarchy data associated with the user interface. In the view hierarchy prediction task, the computing system can mask one or more portions of the view hierarchy data prior to determining the plurality of intermediate embeddings. The pre-training output can be or include a predicted completion for the one or more portions of the view hierarchy data that have been masked. As one example, wherein the predicted completion for the one or more portions of the view hierarchy data that have been masked comprises a textual completion. Stated differently, the view hierarchy prediction task can test the model's ability to fill in masked view hierarchy data.

In some implementations, one or more prediction tasks can be performed (e.g., after pre-training) with the machine-learned interface prediction model based at least in part on the one or more user interface embeddings to obtain one or more respective interface prediction outputs. In some implementations, the one or more prediction tasks can include a search task, and the one or more prediction outputs can include a search retrieval output descriptive of one or more retrieved interface elements similar to a query interface element from the plurality of interface elements. As an example, given the user interface and an interface component of the user interface as a query, and a separate search user interface with a set of candidate interface elements, one or more retrieved elements closest to the query interface element can be selected based on various characteristic(s) of the interface element(s) (e.g., position, functionality, class label, content descriptor, appearance, dimensionality, etc.).

The systems and methods of the present disclosure provide a number of technical effects and benefits. As one example technical effect and benefit, the techniques proposed herein are the first to build a generic feature representation of user interfaces. In particular, the proposed techniques can integrate the powerful transformer models and domain-specific knowledge, e.g., VH and user interactions, to improve machines' understanding of UIs. Improved representations of user interfaces can provide a useful input for a number of downstream tasks including: UI component retrieval based on description, UI generation, UI textual description/read-out, similar component retrieval (e.g., across application and web UIs), referring expression component retrieval, icon classification, application type classification, link component predictions, and many others.

As another example technical effect and benefit, the ability to quickly and efficiently navigate user interfaces is necessary for operation of many modern computing devices. However, a subset of users with certain disabilities (e.g., visual impairment, paralysis, etc.) cannot navigate user interfaces conventionally, and instead rely on accessibility solutions (e.g., screen readers, etc.). Conventionally, these accessibility solutions lack the capacity to understand or otherwise infer the functionality of user interfaces. As such, by training machine-learned model(s) for user interface prediction, generation, and general understanding, systems and methods of the present disclosure provide for a substantial increase in efficiency and accuracy in accessibility solutions for disabled users.

With reference now to the Figures, example embodiments of the present disclosure will be discussed in further detail.

Example Devices and Systems

FIG. 1A depicts a block diagram of an example computing system 100 that performs training and utilization of machine-learned interface prediction models according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned interface prediction models 120. For example, the machine-learned interface prediction models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned interface prediction models 120 can be received from the server computing system 130 over network 180, stored in the user computing device memory 114, and then used or otherwise implemented by the one or more processors 112. In some implementations, the user computing device 102 can implement multiple parallel instances of a single machine-learned interface prediction model 120 (e.g., to perform parallel interface prediction across multiple instances of the machine-learned interface prediction model).

More particularly, interface data descriptive of a user interface can be obtained (e.g., a user interface presented by an application and/or operating system of the user computing device 102, etc.) at the user computing device 102. The user interface can include a plurality of user interface elements (e.g., icon(s), interactable button(s), image(s), textual content, etc.). The interface data can include structural data (e.g., metadata indicative of the position(s)/functionality(s) of interface element(s), etc.) and one or more interface images that depicts the user interface. A plurality of intermediate embeddings can be determined based on the structural data, the one or more interface images, and/or textual content depicted in the one or more interface images (e.g., using text recognition models (OCR), etc.). These intermediate embeddings can be processed with a machine-learned interface prediction model to obtain one or more user interface embeddings. Based on the one or more user interface embeddings, a pre-training task can be performed to obtain a pre-training output.

Additionally or alternatively, one or more machine-learned interface prediction models 140 can be included in or otherwise stored and implemented by the server computing system 130 that communicates with the user computing device 102 according to a client-server relationship. For example, the machine-learned interface prediction models 140 can be implemented by the server computing system 130 as a portion of a web service (e.g., an interface prediction service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned interface prediction models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned interface prediction models 120 and/or 140 based on a set of training data 162. The training data 162 can include, for example, a plurality of labeled and/or unlabeled user interfaces (e.g., interface data, etc.).

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

FIG. 1B depicts a block diagram of an example computing device 10 that performs pre-training of a machine-learned interface prediction model according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
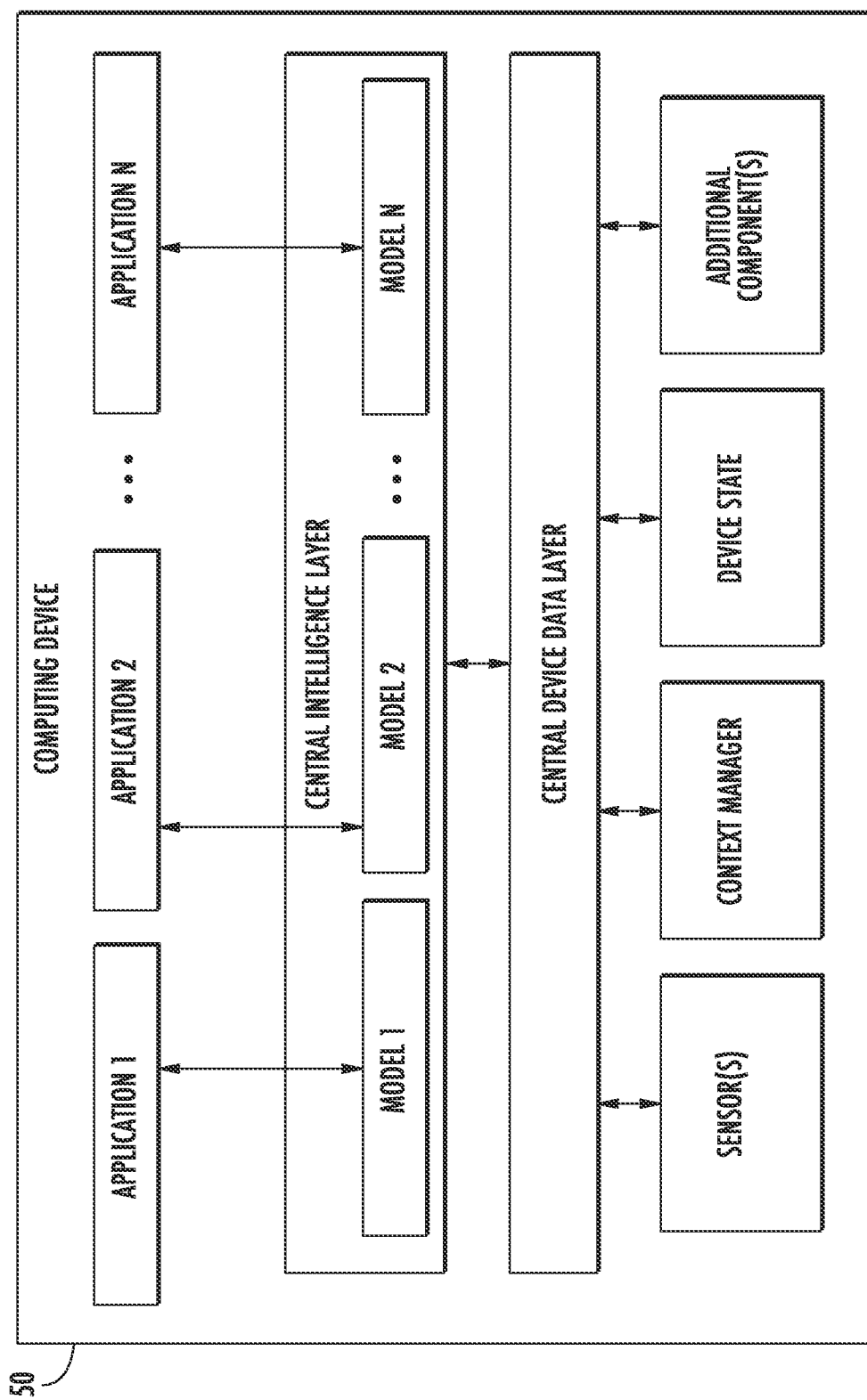
FIG. 1C depicts a block diagram of an example computing device that performs interface prediction with a machine-learned interface prediction model according to example embodiments of the present disclosure.

FIG. 1C depicts a block diagram of an example computing device 50 that performs interface prediction with a machine-learned interface prediction model according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
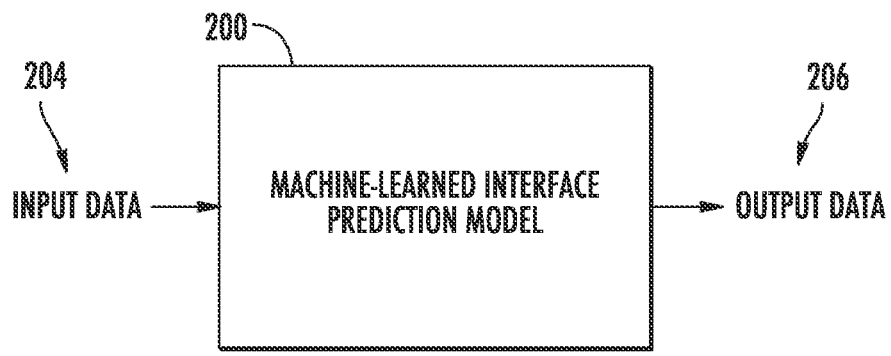
FIG. 2 depicts a block diagram of an example machine-learned interface prediction model according to example embodiments of the present disclosure.

FIG. 2 depicts a block diagram of an example machine-learned interface prediction model 200 according to example embodiments of the present disclosure. In some implementations, the machine-learned interface prediction model 200 is trained to receive a set of input data 204 descriptive of a user interface and, as a result of receipt of the input data 204, provide output data 206 that includes one or more interface prediction outputs.

More particularly, the input data 204 can include interface data descriptive of one or more user interfaces (e.g., a user interface presented by an application and/or operating system, etc.). The input data 204 can include a plurality of user interface elements (e.g., icon(s), interactable button(s), image(s), textual content, etc.). The interface data can include structural data (e.g., metadata indicative of the position(s) of interface element(s), etc.) and an interface image that depicts the user interface. The machine-learned interface prediction model can process the input data 204 to obtain the output data 206. The output data 206 can include one or more prediction outputs (e.g., search results, classification output(s), etc.).

Figure 3:
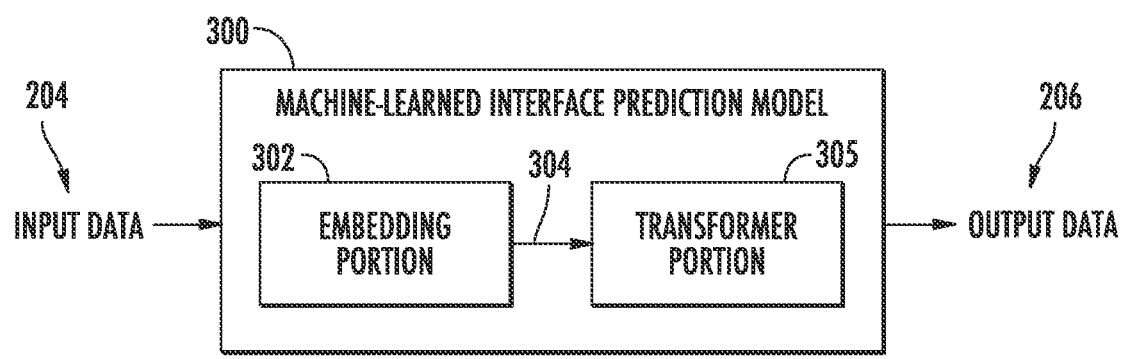
FIG. 3 depicts a block diagram of an example machine-learned interface prediction model according to example embodiments of the present disclosure.

FIG. 3 depicts a block diagram of an example machine-learned interface prediction model 300 according to example embodiments of the present disclosure. The machine-learned interface prediction model 300 is similar to machine-learned interface prediction model 200 of FIG. 2 except that machine-learned interface prediction model 300 further includes an embedding portion 302 and a transformer portion 305.

More particularly, the input data 204 can first be processed by the embedding portion 302 of the machine-learned interface prediction model 300. As an example, embedding portion 302 can process the interface data (e.g., the structural data, the interface image, etc.) of the input data 204 to obtain a plurality of intermediate embeddings 304. The plurality of intermediate embeddings 304 can be processed with the transformer portion 305 of the machine-learned interface prediction model 300 to obtain output data 206. For example, the plurality of intermediate embeddings 304 can be summed. The summed plurality of intermediate embeddings 304 can be processed with the transformer portion 305 of the machine-learned interface prediction model 300 to obtain output data 206. In some implementations, the output data 206 can include one or more prediction output(s) and/or one or more pre-training outputs.

Example Description of View Hierarchy Data

In some implementations, view hierarchy data can be or include a tree-based representation of a user interface. View hierarchy data can be generated from a View Hierarchy or a Document Object Model. It can have various attributes related to the appearance and functionality of UI components. Example view hierarchy components can include the content description, resource id, component class, component text fields in the leaf nodes of view hierarchy: The content description is a brief description of the functionality of this UI component provided by the developer. The component text is the visible text on the component. The resource id and component class indicate the type of the component, e.g., button, checkbox or image, and the name of the static files used to render it.

Some of the important information, like content description, may not in some instances be visible to the user but can be used by applications like Screen Readers to understand the UI.

Figure 4:
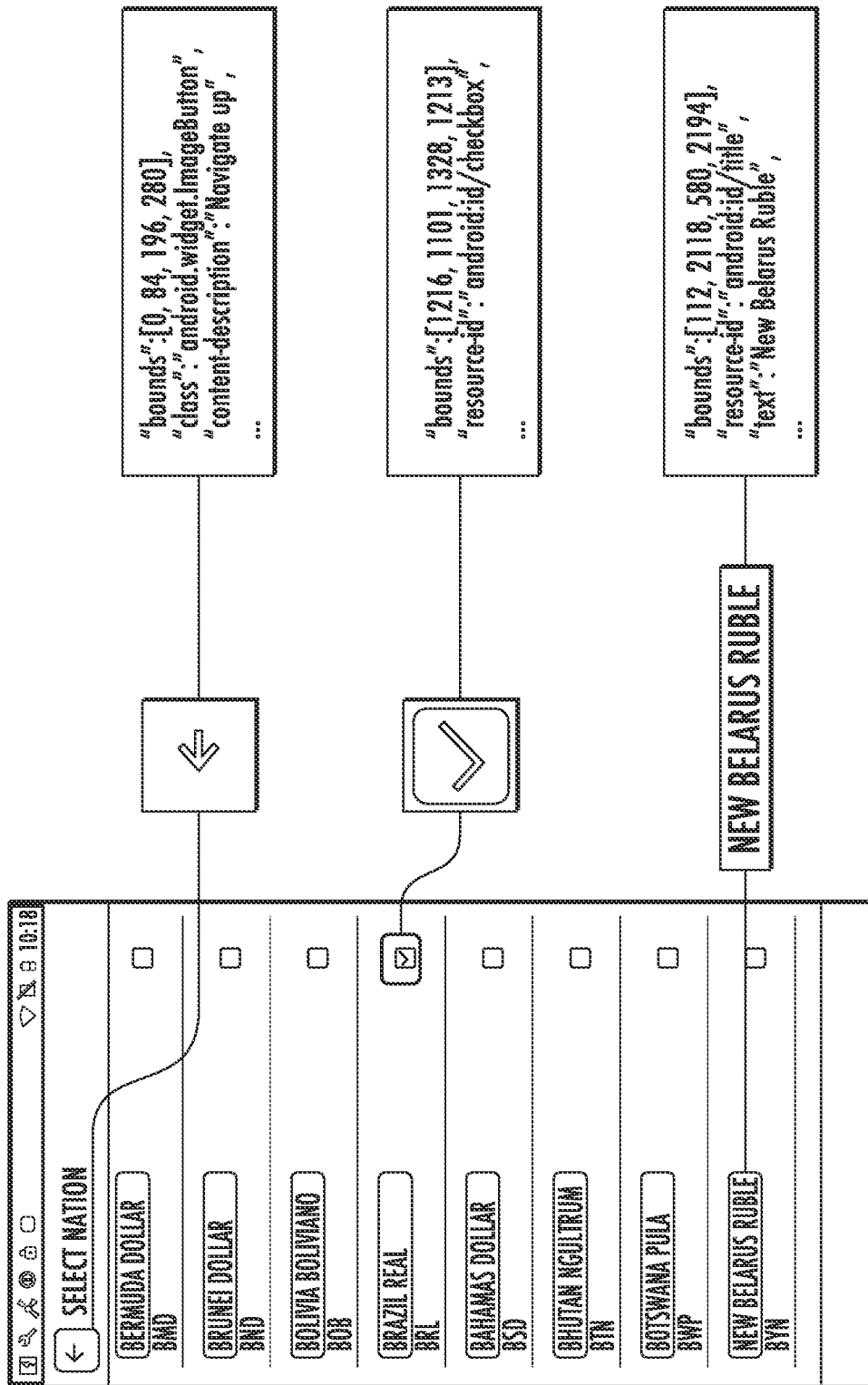
FIG. 4 depicts a graphical representation of example view hierarchy data according to example embodiments of the present disclosure.

FIG. 4 shows examples of leaf nodes in a view hierarchy. In particular, FIG. 4 shows an example of leaf nodes in a view hierarchy. The view hierarchy provides useful semantic information for machines to understand the UI.

Example Model Implementations

Example implementations of the present disclosure adopt the concepts of NLP and extend them to UI understanding. Example implementations of the present disclosure treat the UI components, e.g., buttons, icons, checkboxes etc. as the basic building blocks of a user interface. Similar to sentences, which are composed of word tokens, example implementations of the present disclosure treat these basic UI components (buttons, icons, etc.) as tokens, and the whole UI as a sentence in NLP.

A user interaction trace can be or include a sequence of UIs obtained by starting from a particular UI and interacting with different UI components. Different from sentences, UIs in this trace can be linked through a link component, usually a clickable component like a button or an icon. When a user takes an interaction on that link component, the screen jumps to the next UI. Such a sequence of UIs is analogous to paragraphs or documents in language modeling. Table 1 shows a mapping of the concepts between NLP and UI understanding.

TABLE 1

Concepts mapping between NLP and UI understanding.

| Natural Language Processing | UI Understanding |
| --- | --- |
| Tokens | UI components (buttons, icons, texts etc) |
| Sentences | UIs |
| Word context | UIs |
| Consecutive sentences | UI components in the same UI |
| Paragraph/document | Consecutive UIs |
| Language model | Sequence of UIs |
|  | UI embedding model |

Following this analogy, one concept leveraged by the present disclosure is that the semantic meaning of a UI component can be identified from components in the same UI and the UI that follows the current one. This concept is illustrated in an example in FIG. 5. Here, the first UI is the homepage of an airline app. The user clicks the button with a tick and a circle on it. This button links to a new UI with passenger, time, gate information and a QR code on it. From the elements in the current UI and the next UI, the functionality of the button can be interpreted as "online check-in". Similarly, when the user clicks on the "plus" button it links to a UI with more detailed flight information on it. Hence, the "plus" component indicates "show details".

Figure 5:
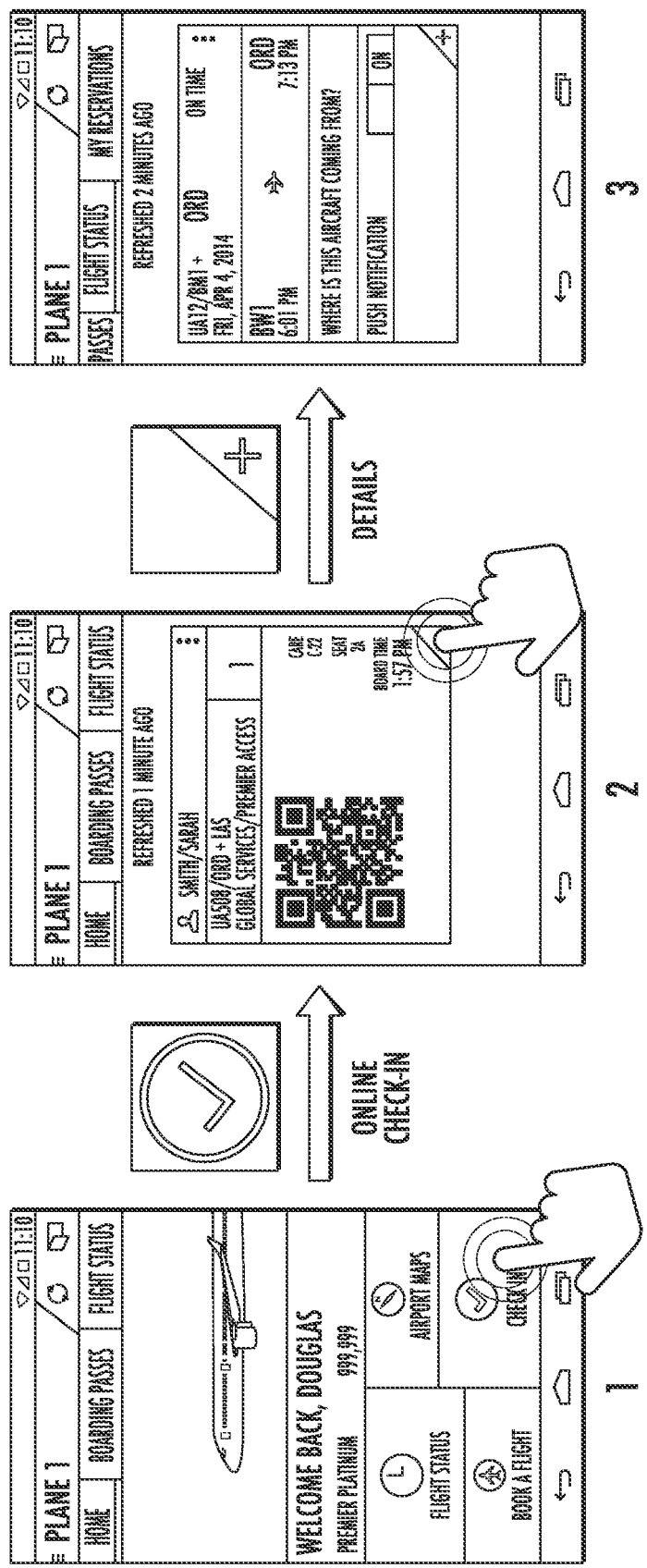
FIG. 5 depicts a graphical representation of an example user interaction trace according to example embodiments of the present disclosure.

Thus FIG. 5 shows an example of user interactions on UIs. The user clicks on the "tick" button in screen 1 and jumps to the boarding-pass page, screen 2. The semantics of the button, online check-in, can be inferred from components on the homepage (e.g., images of plane, airline name) and the components on the next UI (e.g., QR code, passenger information).

Example implementations of the present disclosure include a machine-learned interface prediction model that takes a pair of UIs as input, and outputs the contextual embedding of the UIs and the individual UI components.

Figure 6:
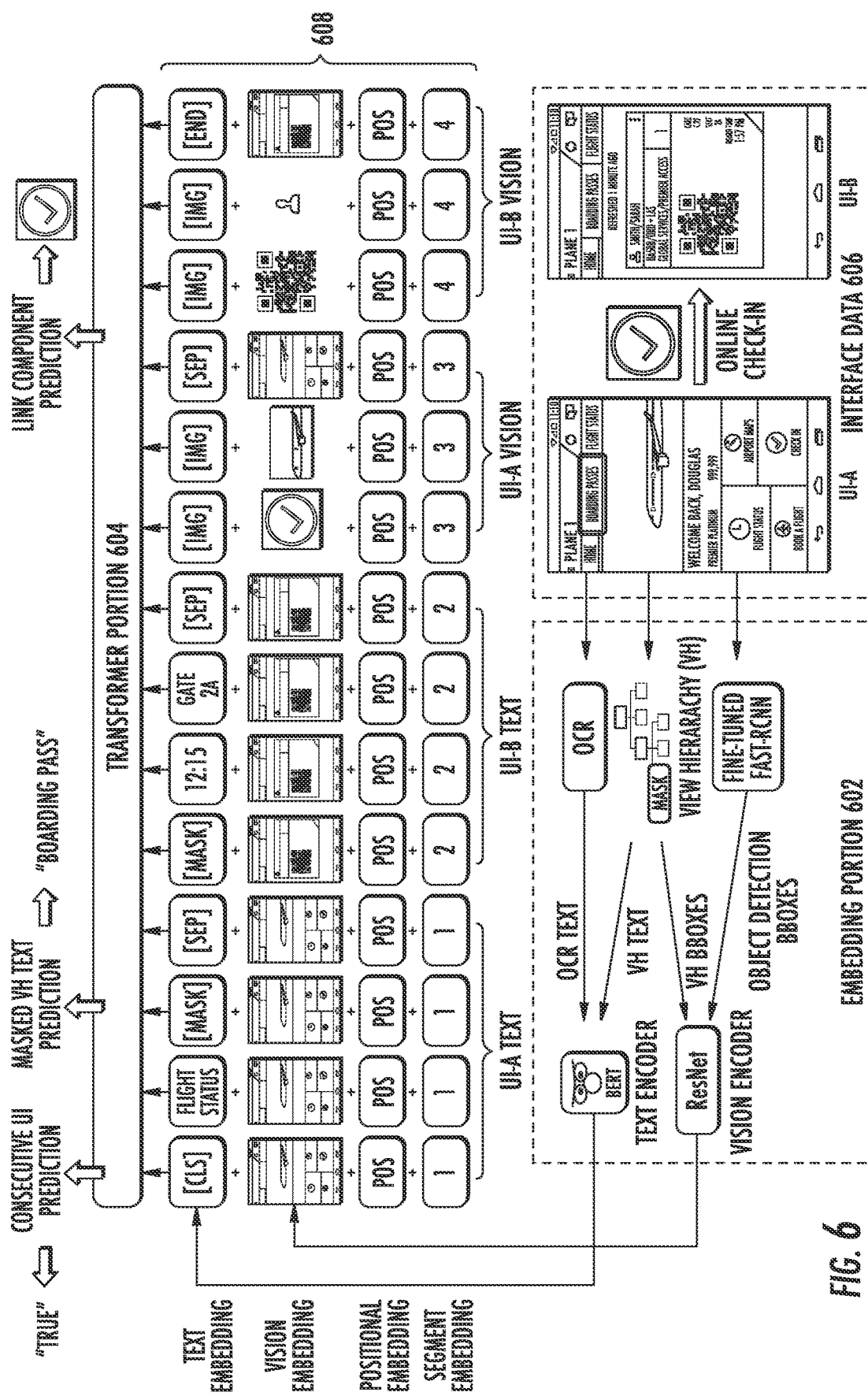
FIG. 6 depicts a graphical representation of an example machine-learned interface prediction model according to example embodiments of the present disclosure.

FIG. 6 shows an example model architecture. The example architecture shown in FIG. 6 includes an embedding portion 602 and a transformer portion 604. The embedding portion 602 can process input interface data 606 to generate a plurality of intermediate embeddings 608. The transformer portion 604 can process the intermediate embeddings 608 to generate one or more user interface embeddings (not graphically shown) which can be used for a number of different tasks (e.g., pre-training tasks and/or downstream prediction tasks). Thus, on a high-level, the model takes a pair of UIs, represented by their text, vision, positional and segment embedding as input. Any number of tasks, including three new UI-specific tasks: link component prediction, consecutive UI prediction, and masked text prediction, can be used to pre-train the model on large-scale UI sequences with user interactions.

More particularly, the example interface data 606 shown in FIG. 6 includes a sequence of two user interfaces (UI-A and UI-B) obtained through performance of one or more user interactions which result in generation of the sequence of two interfaces. The interface data 606 also includes a link component (the image of the circled check mark) that indicates which element from UI-A was the target of a user interaction which led to UI-B.

In the illustrated example, the embedding portion 602 includes an OCR component that performs optical character recognition on the images of the user interface to extract text tokens from the images. A text encoder then generates text embeddings from the extracted text tokens. In the illustrated example, the embedding portion 602 also includes an object detection model and visual encoder which work together to generate visual embeddings from the interface data 606. Visual hierarchy text and bounding boxes can be used as supplemental information for the encoders when generating the embeddings 608 or can be used alternatively to the OCR and/or object detection to recognize and extract textual and/or elements of the user interfaces.

Although the intermediate embeddings 608 are shown as including actual textual tokens and portions of the images of the user interfaces, this illustration is simply to demonstrate the correspondence between the embeddings 608 and the portions of the interface data 606 from which the embeddings 608 are respectively derived. The embeddings 608 will include latent representation (e.g., in a numerical embedding space) of the text and imagery, rather than the text and imagery itself.

The example model illustrated in FIG. 6 extends the original BERT model by adding vision modality and leverages user-interaction related tasks for pre-training. The illustrated model uses a uni-stream architecture that allows full-attention across modalities. First, the two input UIs (UI-A and UI-B) are split into four component segments: UI-A text, UI-B text, UI-A vision and UI-B vision. A special token [CLS] can be prepended to the component sequence, similar to the original BERT model, whose embedding represents the whole two input UIs. The different segments, representing the text and vision parts of the two UIs can be separated with a special token [SEP] and end with another special token [END].

Example Text Embeddings

Different from BERT and other vision-language models, the text tokens of the example model illustrated in FIG. 6 are specifically designed for UI tasks. Each text token can be a concatenation of content description, resource id, component class name and text in a view hierarchy leaf node. The vision segment slots of text tokens can be filled with a special token [IMG]. Overall, each text token, which can be a concatenation of the different fields in View Hierarchy, can be treated as a sentence and processed through a sentence-level text encoder, e.g. BERT, to generate the input text embedding.

Example Vision Embeddings

Similar to the text tokens, the vision tokens can also be specific to the nature of UIs. If the view hierarchy of a UI is available, each vision token can be cropped from the UI using the bounding box of a VH leaf node. If the VH is not available, example implementations can fine-tune a Faster-RCNN to detect UI components in a screenshot and crop components from the detected bounding boxes. Furthermore, a vision encoder, e.g., ResNet-50, can be used to generate the input vision embedding from the cropped images. Specifically, from the vision encoder, the flattened feature map can be taken from the layer just before the fully connected layer as the input vision embedding. Vision tokens of UI-A text, UI-B text and special tokens ([CLS], [SEP] and [END]) can be set as the corresponding whole UI screenshots.

Example Positional Embeddings

Positional embeddings can represent the geometrical position of UI components in the UI. Unlike word tokens in language, components in a UI are not linearly ordered, but are arranged in a 2D space. The positional features of a UI component can be represented with nine features, i.e., $x_{min}$, $y_{min}$, $x_{max}$, $y_{max}$, $x_{center}$, $y_{center}$, height, width and area. $x_{min}$, $y_{min}$ correspond to the top-left corner and $x_{max}$, $y_{max}$ correspond to the bottom-right corner of the UI component, respectively. To deal with the different sizes of UIs, x and y can be normalized relative to the width and height of the UI, respectively.

Example Segment Embeddings

Segment embeddings can indicate whether the corresponding UI component is from UI-A or UI-B, and is a text or vision component. In some implementations, there can be four types of segment embedding representing UI-A text, UI-B text, UI-A vision and UI-B vision, respectively. Some example implementations define a fifth segment type, padding segment, to pad the input sequences to a fixed-length for batch processing. Additional segments can be defined as well, for example, for sequences of UIs greater than two.

In some example implementations, the four types of input features can be processed through a linear layer followed by a normalization layer. Then they can be summed up and passed as input to the transformer portion 604 as a single tensor of shape $L*D_1$, where L is the number of components in the UI pair and $D_1$ is the input embedding dimension. In some implementations, the transformer portion 604 is a uni-stream architecture, allowing attention across components and modalities. The output of the transformer portion 604 can be a contextual embedding of shape $L*D_2$, where $D_2$ is the output embedding dimension of the transformer portion 604. The output embedding at position i can represent the contextual embedding of UI component i, while the embedding of the first component [CLS] provides an overall representation of the UI pair.

Example Pre-Training Approaches

In some implementations, example models can be pre-trained on a number of different pre-training tasks, including three new tasks that are specifically designed to integrate user interactions and UI-specific features: link component prediction, consecutive UI prediction, and masked VH text prediction. The first two pre-training tasks use UI sequences and user interactions to learn the connectivity and relationship of two UIs. The last pre-training task learns the relationship between the text features of a UI component and its context (vision and text).

In one example pre-training approach used in example experiments, a large scale internal dataset obtained by automatically crawling various applications was used. The data consisted of 60,328 user interaction sequences on UIs. Each sequence $S=[s_1, s_2, \ldots s_T]$ contains T UIs, where T ranges from two (a single click) to hundreds. Each pair of consecutive UIs $(s_{i-1}, s_i)$ also has an interaction location (x,y), indicating the click position that results in the transition from $s_{i-1}$ to $s_i$. The data set includes 2.69 M UIs with their view hierarchy from the sequences. A 50%-50% negative sampling was performed to generate non-consecutive UI pairs for the consecutive UI prediction task. Among the negative pairs, half were from the same sequence but not consecutive, while the other half of the negative pairs were from different user sequences. In total, the example implementation of the model used in the experiments was pre-trained on 5.4 M UI pairs with user interactions and view hierarchy.

Example Pre-Training Task #1: Link Component Prediction (LCP)

This task is specifically designed to incorporate the user interaction information from UI sequences. Given two UIs, the task is to predict which component can be clicked on to jump from UI-A to UI-B. The correct link component is obtained via user click position (x,y) during the training data generation. To correctly identify the link components, the model has to learn the semantics of both UIs and find a component whose functionality is to link them. The model takes all text and vision components of both UIs as candidates and selects one from them. The objective can be formulated as $$p = \text{softmax}(MLP(f_\theta(x))), \quad (1)$$

$$L_{LCP} = -\Sigma_{x \in D} 1_{LC}(x) CE(p, y), \quad (2)$$

where x is sampled from the training set D. $f_\theta(x)$ represents the embedding generated by the model. MLP(•) is a multi-layer perceptron, and p is the predicted probability of each UI component being the link component. $1_{LC}(x)$ is an indicator function whose value is 1 if the link component is available in this training pair, i.e. the two UIs are consecutive and the click location (x,y) refers to a valid UI component, otherwise 0. CE(•) is a standard multi-class cross-entropy loss and y indicates the one-hot label of the correct link component.

Pre-Training Task #2: Consecutive UI Prediction (CUI)

This task requires the model to learn the relationship between two UIs. As shown in Table 1, a UI can be analogized to a sentence in NLP. The consecutive UIs prediction task predicts whether UI-B can be obtained by a single interaction from UI-A. In pre-training, a UI pair $(s_{i-1}, s_i)$ from the same sequence S is a positive training sample pair. A 50%-50% negative sampling can be performed to generate negative samples. Among the negative samples, half of them (25% of total training pairs) can be generated by sampling two non-consecutive UIs from the same sequence, i.e. $(s_i, s_j)$ where $i+1 \neq j$. The other half can consist of two UIs from different user interaction sequences, i.e. $(s_i, s_j)$, where $s_i$ is from sequence S and $v_j$ is from sequence V and $S \neq V$. Other ratios of modified to unmodified can be used other than 50/50. Formally, the loss function is $$L_{CUI} = -\Sigma_{x \in D} y \log(\hat{y}) + (1-y) \log(1-\hat{y}) \quad (3)$$

where x is a training sample (a pair of UIs) from the training set D, and y is the label of whether the two UIs are consecutive. $\hat{y} = \text{sigmoid}(MLP(f_\theta(x)))$ is the model predicted probability that the pair of UIs in x are consecutive. A standard binary cross-entropy loss can be applied to it.

Pre-Training Task #3: Masked VH Text Prediction.

This task is similar to the masked language modeling (MLM) task in BERT pre-training. The task can be facilitated by randomly masking 15% of the text components from the UI view hierarchy data. The main difference is, as each text token in interface prediction model is a concatenation of multiple fields (content description, source id, component type and text) from the view hierarchy, it contains more than one word token and therefore it can be treated as a text "sentence". Therefore, compared to BERT where each word token is directly predicted, the interface prediction model can predict the high-dimensional text embedding of the sentence and treats it as a regression task. Formally, the loss for masked VH text prediction is:

$$L_{mast} = \Sigma_{x \in D} \Sigma_{i=0}^{N-1} 1_{mask}(x,i) \|f_\theta^i(x_{mask}) - g^i(x)\|_2^2 \quad (4)$$

where D is the training set. x is the unmasked training example and $x_{mask}$ is the training example with masked text. N is the total number of UI components in a training example. $f_\theta$ is the interface prediction model with parameter $\theta$, and g is the sentence-level text encoder (we choose BERT in the pre-training), respectively. $f_\theta^i(x_{mask})$ denotes the interface prediction model output embedding of the i-th component in the masked example $x_{mask}$. $g_i(x)$ denotes the sentence encoder output of the i-th component in the unmasked example. $1_{mask}(x,i)$ is an indicator function whose value is 1 if the component i is masked in example x, otherwise 0.

Thus, in some example implementations, the overall loss function for pre-training can be defined as:

$$L = L_{LCP} + \lambda_{CUI} L_{CUI} + \lambda_{mask} L_{mask} \quad (5)$$

Example Fine-Tuning of the Interface Prediction Model

Similar to how BERT is used as a generic feature representation for different NLP downstream tasks, fine-tuning the interface prediction model for a variety of UI understanding tasks is relatively easy and does not require substantial task-specific architecture changes nor a large amount of task-specific data. The downstream input to the interface prediction model needs to be appropriately formatted into segments, as illustrated in FIG. 6. During fine-tuning, a task-specific loss function is added on top of the interface prediction model for training. All parameters, including the text and vision encoder, can be jointly tuned in an end-to-end manner to achieve the best performance.

Same as pre-training, during fine-tuning VH texts and bounding boxes can be used if VH is available in a downstream task. Otherwise, OCR and object detection can be performed to extract the text and vision components from the UI, respectively. It is worth noting that, although the interface prediction model is pre-trained on UI pairs, it can also handle single-UI and multi-UI tasks.

Example Single-UI Tasks

As discussed above, the input data format is designed as [UI-A text, UI-B text, UI-A vision, UI-B vision]. For the downstream tasks which only involve a single UI, the input data can be converted into the interface prediction model format by leaving the UI-B text and UI-B vision segments empty. For tasks involving natural language input, e.g., UI component retrieval based on its description, the language input can be passed in the UI-A text segment as a text token with the whole UI screenshot being used as the corresponding vision token.

Example Two-UI Tasks

Since the interface prediction model is pre-trained on UI pairs, it is natural to apply this model on tasks with two UIs as input, e.g. similar UI component retrieval. The corresponding text and vision components can be assigned to UI-A/B text and vision segments in FIG. 6.

Extension to Multi-UI Tasks

The interface prediction model can also be extended to multi-UI (≥3) settings, though these types of tasks are not common in practice. Similar to two-UI tasks, different UIs and modalities need to be separated by the [SEP] token. The only difference is that more segment embedding representing the newer UI segments needs to be trained.

Example Prediction Tasks

The proposed models can be fine-tuned on multiple types of downstream tasks. Example UI downstream tasks include: similar component retrieval (across app and web UIs), referring expression component retrieval, icon classification, and application type classification.

Similar UI Component Retrieval

Similar UI component retrieval focuses on the high-level functionality of UI components. Given an anchor component on a UI, the task is to choose the most similar component based on their functionality on the other UI from a list of UI component candidates. After generating the component-level embedding using the proposed interface prediction model, some example implementations can use dot-product of the embedding of the anchor and candidate components as the similarity scores and select the component with the highest score as the prediction.

Referring Expression Component Retrieval

The referring expression component retrieval task takes a referring expression and a UI screenshot as input, and the model is expected to select the UI component that the expression refers to from a list of the UI components detected on the screen. This is a typical task in voice-based control systems where the user can interact with an element on the screen by describing it, e.g., "click settings", "select on the back arrow at the top". To correctly select the UI component, the model not only has to take into account the semantics of the component, but also its relationship to other components.

Icon Classification

The goal of this task is to identify the type of an icon. Having this information is beneficial for screen readers to understand the type of elements when content description and alt-text are not present. Some example implementations can use the user interface embedding in the corresponding position as the contextual embedding of the UI components for icon classification.

Application Type Classification

In this task, the goal of the model is to predict the type of an app, e.g., shopping, communication, arts etc. For example, a model can be fine-tuned using UIs which have been labeled with a ground truth application type retrieved from an application store prediction for the corresponding application.

Example Methods

Figure 7:
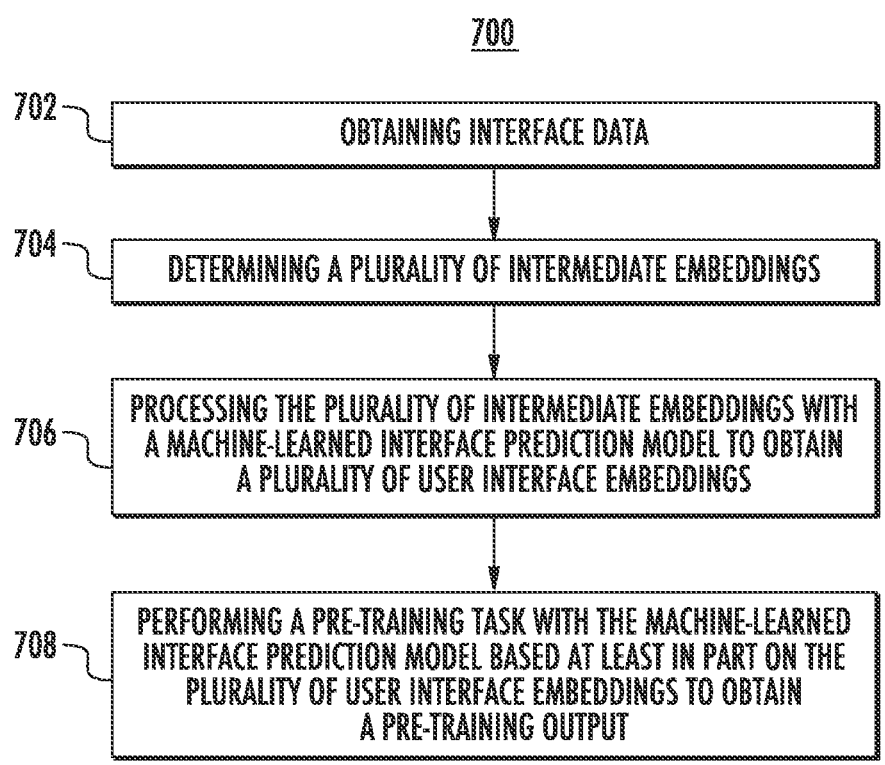
FIG. 7 depicts a block diagram of an example method to pre-train a machine-learned interface prediction model according to example embodiments of the present disclosure.

FIG. 7 depicts a flow chart diagram of an example method to perform pre-training of a machine-learned interface prediction model according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain interface data. More particularly, the computing system can obtain interface data descriptive of a sequence of two or more user interfaces that each include a plurality of interface elements. The interface data can include structural data and one or more interface images depicting the user interfaces. The structural data can be indicative of one or more positions of one or more respective interface elements of the plurality of interface elements.

At 704, the computing system can determine a plurality of intermediate embeddings. More particularly, the computing system can determine a plurality of intermediate embeddings based at least in part on one or more of the structural data, the interface image, or textual content depicted in the interface image.

At 706, the computing system can process the plurality of intermediate embeddings to obtain a plurality of user interface embeddings. More particularly, the computing system can process the plurality of intermediate embeddings with a machine-learned interface prediction model to obtain a plurality of user interface embeddings.

At 708, the computing system can perform a pre-training task. More particularly, the computing system can perform a pre-training task based at least in part on the plurality of user interface embeddings to obtain a pre-training output.

At 708 one or multiple pre-training tasks can be performed. Pre-training tasks can be performed in parallel (i.e., jointly) or in series.

In some implementations, the method can further include evaluating, by the computing system, a loss function that evaluates a difference between ground truth data and the pre-training output; and adjusting, by the computing system, one or more parameters of the machine-learned interface prediction model based at least in part on the loss function.

ADDITIONAL DISCLOSURE

The technology discussed herein makes reference to servers, databases, software applications, and other computer-based systems, as well as interactions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for training and utilization of machine-learned models for user interface interaction understanding, comprising:
    obtaining, by a computing system comprising one or more computing devices, interface data that comprises a sequence of two or more user interfaces obtained through performance of one or more user interactions which result in generation of the sequence of two or more user interfaces, wherein, for each user interface in the sequence of two or more user interfaces, the interface data comprises one or more interface images depicting the user interface;
    determining, by the computing system, a plurality of intermediate embeddings based at least in part on the interface data;
    processing, by the computing system, the plurality of intermediate embeddings with a machine-learned interface prediction model to obtain one or more user interface embeddings; and
    performing, by the computing system, fine-tuning on the machine-learned interface prediction model based on the one or more user interface embeddings.

2. The computer-implemented method of claim 1, wherein the interface data further comprises data descriptive of one or more link components, wherein the one or more link components comprise elements of the user interfaces which are the targets of the user interactions.

3. The computer-implemented method of claim 2, wherein the data descriptive of one or more link components comprises images of the one or more link components.

4. The computer-implemented method of claim 1, wherein the plurality of intermediate embeddings comprises one or more image embeddings, one or more textual embeddings, and one or more positional embeddings.

5. The computer-implemented method of claim 1, wherein the plurality of intermediate embeddings comprises one or more vision embeddings.

6. The computer-implemented method of claim 5, wherein determining the plurality of intermediate embeddings based at least in part on the interface data comprises:
    fine-tuning, by the computing system, a neural network to detect user interface components in the one or more interface images; and
    determining, by the computing system, the one or more vision embeddings based on the detected user interface components.

7. The computer-implemented method of claim 6, wherein determining the one or more vision embeddings based on the detected user interface components comprises:
    cropping, by the computing system, the one or more user interface images;
    providing, by the computing system, the cropped one or more user interface images to a vision encoder; and
    receiving, by the computing system, one or more flattened feature maps as the one or more vision embeddings from the vision encoder, the one or more flattened feature maps being generated by the vision encoder based on the one or more cropped user interface images.

8. The computer-implemented method of claim 1, wherein performing fine-tuning on the machine-learned interface prediction model based on the one or more user interface embeddings comprises:
    formatting, by the computing system, a downstream input into one or more segments;
    evaluating, by the computing system, a task-specific loss function for the machine-learned interface prediction model; and
    adjusting, by the computing system, one or more parameters of the machine-learned interface prediction model based at least in part on the task-specific loss function.

9. The computer-implemented method of claim 8, wherein the downstream input is a single user interface input, and wherein the interface data for one of the two or more user interfaces is left empty.

10. The computer-implemented method of claim 8, wherein a specific task associated with the task-specific loss function is natural language input, and wherein the downstream input is a language input comprising a text segment of a first user interface of the two or more user interfaces as a text token and the interface image depicting the first user interface as a corresponding vision token.

11. The computer-implemented method of claim 1, wherein the interface data further comprises structural data that is indicative of one or more positions of each of a plurality of interface elements included in the user interface, and wherein the structural data for each user interface comprises view hierarchy data associated with the user interface.

12. A computing system, comprising:
one or more processors; and
one or more tangible, non-transitory computer readable media storing computer-readable instructions that when executed by one or more processors cause the one or more processors to perform operations, the operations comprising:
obtaining interface data that comprises a sequence of two or more user interfaces obtained through performance of one or more user interactions which result in generation of the sequence of two or more user interfaces, wherein, for each user interface in the sequence of two or more user interfaces, the interface data comprises one or more interface images depicting the user interface;
determining a plurality of intermediate embeddings based at least in part on the interface data;
processing the plurality of intermediate embeddings with a fine-tuned machine-learned interface prediction model to obtain one or more user interface embeddings;
performing a prediction task based at least in part on the one or more user interface embeddings to obtain a prediction output; and
fine-tuning the machine-learned interface prediction model using a task-specific loss function based on the prediction task.

13. The computing system of claim 12, wherein the prediction task is similar user interface component retrieval, and wherein performing the prediction task comprises:
selecting a candidate user interface component based on a given component associated with at least one user interface embedding of the one or more user-interface embeddings.

14. The computing system of claim 13, wherein performing the prediction task comprises:
generating a component level embedding for the most similar user interface component using the machine-learned interface prediction model;
determining a dot product of the at least one user interface embedding and the component level embedding; and
determining a similarity score for the candidate user interface component based on the dot product.

15. The computing system of claim 12, wherein the prediction task is expression component retrieval.

16. The computing system of claim 15, wherein performing the prediction task comprises:
receiving, as input, a referring expression and an image of a user interface currently displayed; and
selecting, from components of the user interface detected in the image of the user interface, a component referred to by the referring expression as the prediction output.

17. The computing system of claim 12, wherein the prediction task is icon classification.

18. The computing system of claim 17, wherein performing the prediction task comprises:
obtaining a first user interface embedding from the one or more user interface embeddings, the first user interface embedding for a user interface component at a first position in at least one user interface of the two or more user interfaces;
using the first user interface embedding as a contextual embedding for the user interface component; and
classifying an icon for the user interface component based on the contextual embedding.

19. The computing system of claim 12, wherein
the prediction task is application type classification;
the fine-tuned machine-learned interface prediction model has been fine-tuned using one or more user interfaces with ground truth application type labels; and
wherein the prediction output is a type of software application associated with at least one of the two or more user interfaces.

20. One or more tangible, non-transitory computer readable media storing computer-readable instructions that when executed by one or more processors cause the one or more processors to perform operations, the operations comprising:
obtaining interface data that comprises a sequence of two or more user interfaces obtained through performance of one or more user interactions which result in generation of the sequence of two or more user interfaces, wherein, for each user interface in the sequence of two or more user interfaces, the interface data comprises one or more interface images depicting the user interface;
determining a plurality of intermediate embeddings based at least in part on the interface data;
processing the plurality of intermediate embeddings with a fine-tuned machine-learned interface prediction model to obtain one or more user interface embeddings;
performing a prediction task based at least in part on the one or more user interface embeddings to obtain a prediction output; and
fine-tuning the machine-learned interface prediction model using a task-specific loss function based on the prediction task.

* * * * *